(12) United States Patent
Lee et al.

(10) Patent No.: US 7,933,918 B2
(45) Date of Patent: Apr. 26, 2011

(54) CONTENT HOOK-UP APPARATUS AND METHOD

(75) Inventors: Woo-hyoung Lee, Yongin-si (KR); Eun Namgung, Suwon-si (KR); Do-jun Yang, Yongin-si (KR); Hyung-tak Choi, Suwon-si (KR); In-chul Hwang, Suwon-si (KR); Zhang-hoon Oh, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 384 days.

(21) Appl. No.: 11/924,851

(22) Filed: Oct. 26, 2007

(65) Prior Publication Data
US 2008/0228817 A1    Sep. 18, 2008

(30) Foreign Application Priority Data
Mar. 16, 2007   (KR) ................... 10-2007-0026080

(51) Int. Cl.
*G06F 17/30* (2006.01)
(52) U.S. Cl. ........................ 707/769; 707/913
(58) Field of Classification Search .................. 707/602, 707/769, 913, E17.006
See application file for complete search history.

(56) References Cited

U.S. PATENT DOCUMENTS

| | | | |
|---|---|---|---|
| 7,110,755 B2 * | 9/2006 | Shibasaki et al. | 455/420 |
| 2002/0095687 A1 | 7/2002 | Shintani et al. | |
| 2004/0125707 A1 * | 7/2004 | Vargas | 369/30.18 |
| 2007/0067305 A1 * | 3/2007 | Ives | 707/10 |
| 2007/0107019 A1 * | 5/2007 | Romano et al. | 725/80 |

FOREIGN PATENT DOCUMENTS

| | | |
|---|---|---|
| JP | 10-240660 A | 9/1998 |
| KR | 10-2002-0062455 A | 7/2002 |

* cited by examiner

*Primary Examiner* — Fred I Ehichioya
(74) *Attorney, Agent, or Firm* — Sughrue Mion, PLLC

(57) ABSTRACT

The present invention relates to a content hook-up apparatus and method. In particular, the present invention relates to a content hook-up apparatus that searches and downloads various formats of content corresponding to a search list input from a user, performs format conversion on the downloaded content so as to be playable on a predetermined display apparatus, and provides the content subjected to the format conversion to the display apparatus, which can play the content in a streaming manner. The content hook-up apparatus searches and downloads the content at a predetermined interval according to the user's setting and maintains a reserve space for storing the downloaded content.

20 Claims, 4 Drawing Sheets

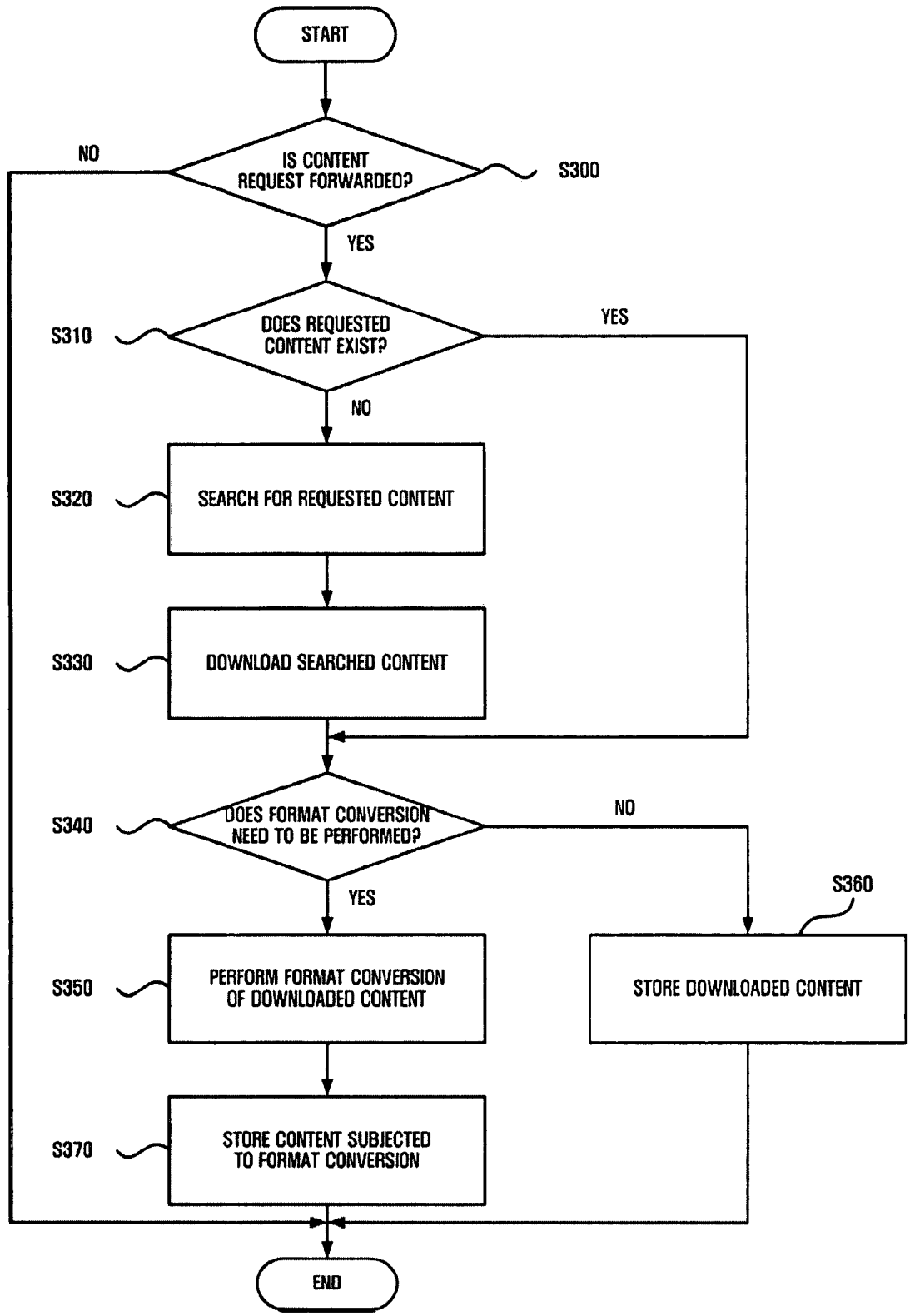

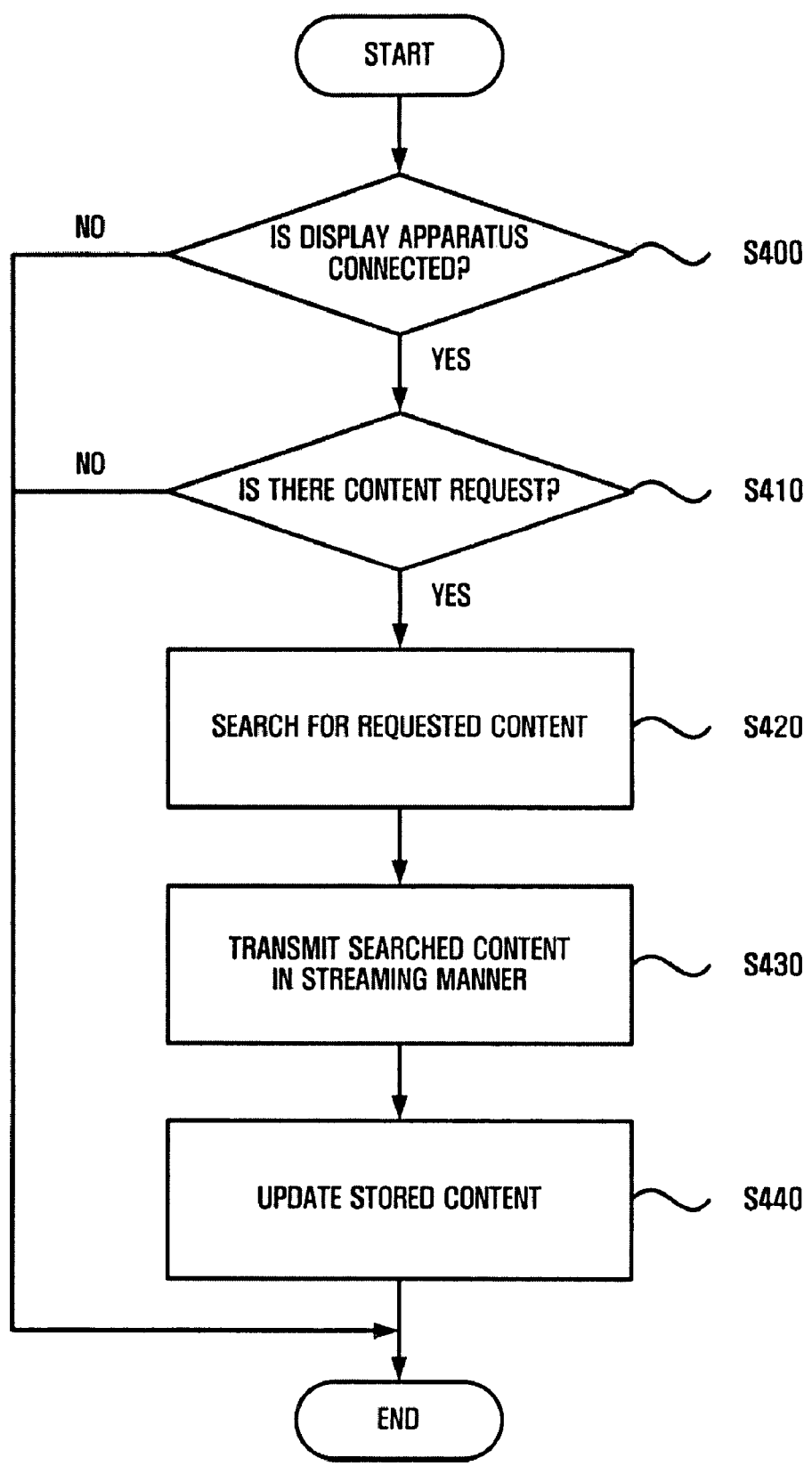

CONTENT HOOK-UP APPARATUS AND METHOD

CROSS REFERENCE TO RELATED APPLICATION

This application claims priority from Korean Patent Application No. 10-2007-0026080 filed on Mar. 16, 2007 in the Korean Intellectual Property Office, the disclosure of which is incorporated herein by reference in its entirety.

BACKGROUND OF THE INVENTION

1. Field of the Invention

The present invention relates to a content hook-up apparatus and method. In particular, the present invention relates to a content hook-up apparatus that searches for and downloads various formats of content corresponding to a search list input by a user, performs format conversion on the downloaded content so as to be playable on a predetermined display apparatus, and provides the content subjected to the format conversion to the display apparatus, which can play the content, in a streaming manner. The content is subject to search, download, and format conversion at a predetermined interval according to the user's preferences.

2. Description of the Related Art

In the current information age, demand for information is increasing, and it is becoming more common for people to connect to the Internet, which is referred to as a sea of information, so as to acquire desired information and to enjoy entertainment. In particular, the use of the World Wide Web (hereinafter "Web") that supports text, video, music, and moving pictures is explosively increasing. Further, a teletext system repeatedly and simultaneously provides various teletext programs by multiplexing text and figure information in a signal television broadcast channel. The teletext system provides live information, such as news articles, weather information, television program guides, leisure information, sports, entertainment, and real-time stock market information.

Among these, the acquisition of information through the Internet is mainly performed using a personal computer (PC) or an Internet television (TV). In this case, a user stores addresses of frequently used Internet sites using a bookmark function of the personal computer. Accordingly, when the user wants to connect to those addresses, he/she needs only to click on the bookmark. This reduces a time required to search for in format ion.

However, a considerable amount of time and labor is still required to search for desired data on the Internet that is open to everyone around the world and has an enormous amount of information. Further, even if the data is found, the data may not be supported on a display apparatus.

In Korean Unexamined Patent Publication No. 1999-025610, entitled "Internet Connection Device for Internet Television having Internet Function", there is suggested an Internet connection device for an Internet TV that searches a site on the Internet for a time slot other than a current TV watching time slot.

In Korean Unexamined Patent Publication No. 2000-0033295, entitled "Automatic Information Search Method", there is suggested an automatic information search method that searches for desired information on the basis of user-prescribed search information and stores a corresponding Internet site or corresponding information from additional information of a broadcast signal in a memory on the basis of the search result. According to this automatic information search method, since it is not necessary for the user to confirm and search the desired information in full, a search time can be reduced.

In Korean Unexamined Patent Publication No. 2002-0062455, entitled "News Provision Method", there is suggested a news provision method that automatically downloads news articles on the Web at a predetermined time and provides the news articles to a user in real time. In this case, the news articles on the Web are classified on the basis of the preference of the user. Further, only a specified code regarding news information on the Web is downloaded and the size, position, color, and font are processed and edited according to the user's operation.

In U.S. Patent Publication No. 2002095687, entitled "Contents Cashing for Interactive Television", there is suggested a technology that checks a cache in a server or a cache in a set-top box according to a request for URL content, receives the URL content from the cache when the URL content is stored in the cache, and displays the received URL content, and, when the URL content does not exist in the cache, downloads the URL content from a remote server. According to this technology, it is determined whether or not to download the URL content according to whether or not the URL content is stored in the cache.

In such related technologies, as Web content to be provided to a display apparatus, providing an IPTV (Internet Protocol TV) service, and metadata having various formats, the Web content may not be supported on the display apparatus. Further, since bandwidth varies according to the status of the network, stable streaming cannot be ensured.

SUMMARY OF THE INVENTION

An aspect of the present invention is to provide an apparatus and method that searches and downloads various formats of content corresponding to a search list input from a user and converts the formats of the downloaded content into formats corresponding to a display apparatus which plays only a specified format of content, such that the content can be played on the display apparatus.

Another aspect of the present invention is to provide an apparatus and method that compares a search list and a list of stored content, when content subjected to format conversion is stored, maintains a reserve space in a storage module, which stores the content, and downloads content corresponding to the search list.

Still another aspect of the present invention is to provide an apparatus and method that provides predetermined content stored in a storage module to a display apparatus, which can play the content, according to a user's request, in a streaming manner.

Aspects of the present invention are not limited to those mentioned above, and other aspects of the present invention will be apparently understood by those skilled in the art through the following description.

According to an aspect of the present invention, there is provided a content hook-up apparatus, the content hook-up apparatus including a search module which searches for content included in a predetermined search list and which updates a list of content stored in a predetermined storage module, a format conversion module which converts content, among the searched content, having a format unplayable on a predetermined display apparatus, into content having a format playable on the display apparatus, and provides a conversion result, and a communication module which transmits content, among the searched content according to the conversion result, playable on the display apparatus, to the display apparatus.

According to another aspect of the present invention, there is provided a content hook-up system, the content hook-up system including a content provision server which provides content, a content hook-up apparatus which converts content, among the content provide by the content provision server, having a format unplayable on a predetermined display apparatus into content having a format playable on the display apparatus, and provides a conversion result, and a display apparatus which receives playable content, among the content provided by the content providing server according to the conversion result and displays the received content.

According to still another aspect of the present invention, there is provided a content hook-up method, the content hook-up method including searching for content included in a predetermined search list and updating a list of content stored in a predetermined storage module, converting content having a format unplayable on a predetermined display apparatus, among the searched content, into content having a format playable on the display apparatus, and providing a conversion result, and transmitting content, among the searched content according to the conversion result, playable on the display apparatus to the display apparatus.

BRIEF DESCRIPTION OF THE DRAWINGS

The above and other aspects of the present invention will become more apparent by describing in detail preferred exemplary embodiments thereof with reference to the attached drawings in which:

FIG. 3 is a flowchart showing a content download process according to an exemplary embodiment of the present invention; and FIG. 4 is a flowchart showing a content hook-up process according to an exemplary embodiment of the present invention.

DETAILED DESCRIPTION OF EXEMPLARY EMBODIMENTS OF THE INVENTION

Figure 1:
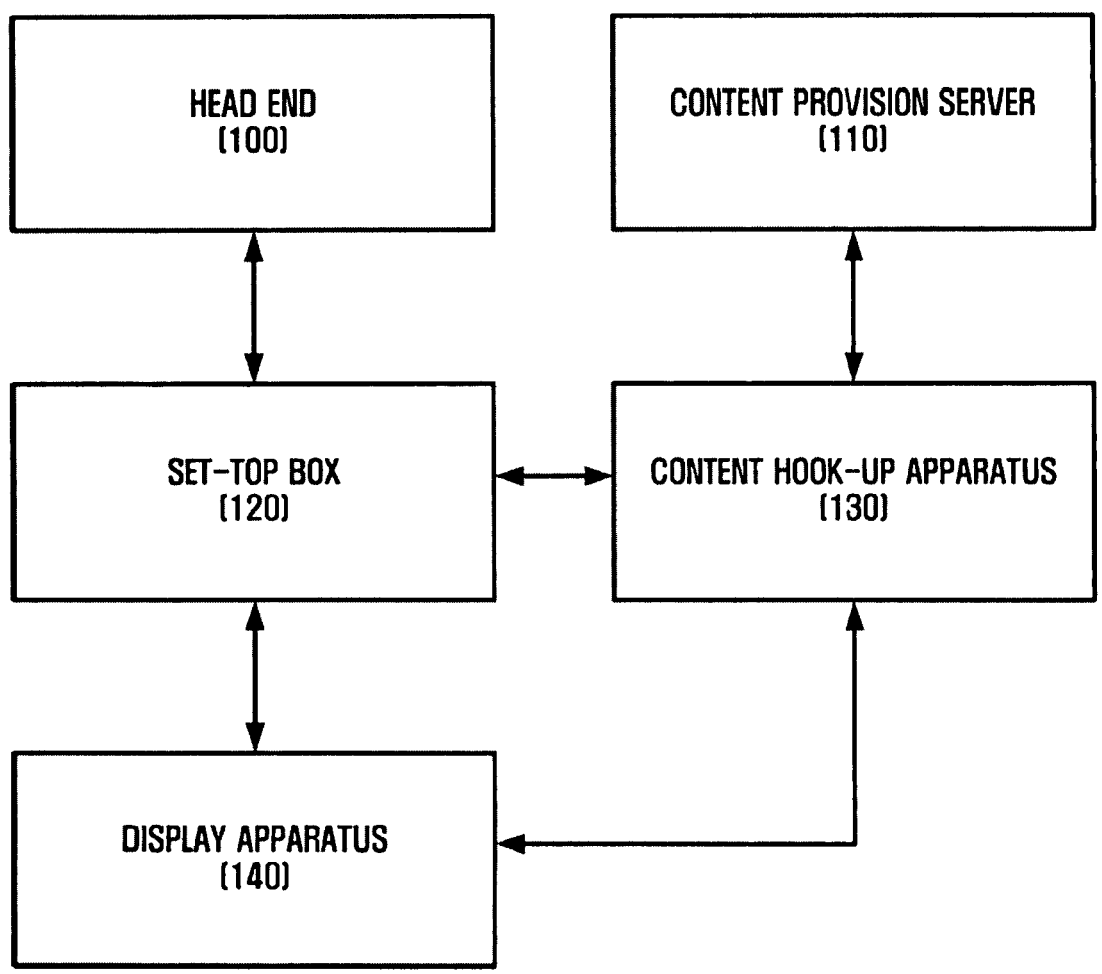
FIG. 1 is a diagram showing a content hook-up system according to an exemplary embodiment of the present invention.

The above and other aspects of the present invention, and methods of accomplishing the same, may be understood more readily by reference to the following detailed description of exemplary embodiments and the accompanying drawings. The present invention may be embodied in many different forms and should not be construed as being limited to the exemplary embodiments set forth herein. Rather, these exemplary embodiments are provided so that this disclosure will be thorough and complete and will fully convey the concept of the present invention to those skilled in the art. Like reference numerals refer to like elements throughout the specification.

FIG. 1 is a diagram showing a content hook-up system according to an exemplary embodiment of the present invention.

A content hook-up system according to an exemplary embodiment of the present invention includes a head end 100, a content provision server 110, a set-top box 120, a content hook-up apparatus 130, and a display apparatus 140.

According to an exemplary embodiment of the present invention, the head end 100, the set-top box 120, and the display apparatus 140 may be components for providing a usual IPTV service. Accordingly, in the present invention, the detailed descriptions thereof will be omitted.

That is, the content hook-up system according to an exemplary embodiment of the present invention may include only the content provision server 110, the content hook-up apparatus 130, and the display apparatus 140, or may further include the set-top box 120.

First, when the content hook-up system includes the content provision server 110, the content hook-up apparatus 130, and the display apparatus 140, the content provision server 110 and the content hook-up apparatus 130 are connected to each other through a wired or wireless Internet network (not shown), and the content hook-up apparatus 130 and the display apparatus 140 are connected to each other through a IEEE 1394 connection. However, the communication interface between the content hook-up apparatus 130 and the display apparatus 140 is not limited to IEEE 1394.

The content provision server 110 is a server that, when a request for predetermined content is forwarded from the content hook-up apparatus 130 or the display apparatus 140 of the user, provides various formats of content and metadata corresponding to the user's request. The content that is provided by the content provision server 110 may be content regarding images, graphics, sound, and moving pictures on the Internet in a hypertext format. The content may include UCC (User Created Content), flash, and Internet news articles.

The content is searched for by the content hook-up apparatus 130 according to a user-prescribed keyword.

The content search according to the user's request is performed according to the following two methods.

The first search method refers to the search by the content hook-up apparatus 130 on a storage module 230.

The content search by the content hook-up apparatus 130 is performed on a storage module 230 in order to search for content corresponding to the user's request. If the content corresponding to the user's request exists, the content is provided to the display apparatus 140 in a streaming manner.

The content that is provided to the display apparatus 140 in the streaming manner is subject to format conversion by the content hook-up apparatus 130 so as to be playable on the display apparatus 140.

The second search method refers to the search by the content hook-up apparatus 130 on the content provision server 110.

In the second search method, when the user-requested content is not found in the storage module 230 of the content hook-up apparatus 130 during the first search, the content provision server 110 connected to the content hook-up apparatus 130 is directly searched.

With the content search of the content provision server 110, the user can receive a search result list and the content from the search result list. The content is downloaded through the content hook-up apparatus 130, subject to format conversion to be playable on the display apparatus 140, and then provided to the display apparatus 140 in the streaming manner.

The content that is downloaded to the storage module 230 of the content hook-up apparatus 130 is subjected to the format conversion so as to be playable on the display apparatus 140.

The format conversion by the content hook-up apparatus 130 may be performed while the content is downloaded from the content provision server 110 to the content hook-up apparatus 130, or may be performed while the content is provided from the content hook-up apparatus 130 to the display apparatus 140 in the streaming manner according to the user's request.

The search, download, and format conversion are set by the user in advance to be performed by the content hook-up apparatus 130.

The content that is stored in the storage module 230 of the content hook-up apparatus 130 is updated through comparison of a content search list and a list of currently stored content. At this time, a control module 240 deletes content other than the content in the search list among the content in the list of stored content from the storage module 230, and maintains a reserve space in the storage module 230 such that predetermined content corresponding to the search list can be stored therein.

The search result list that is provided to the user may be provided regardless of the search method, and a list of content directly playable on the display apparatus 140 and a list of content playable after the format conversion may be categorized in the search list. This may vary according to the user's setting.

When the content hook-up system includes the content provision server 110, the set-top box 120, the content hook-up apparatus 130, and the display apparatus 140, the content hook-up system is substantially the same as the above-described content hook-up system, except that the content to be provided to the display apparatus 140 in the streaming manner passes through the set-top box 120. Accordingly, the detailed description thereof will be omitted.

In the content hook-up system having the above-described components, as the display apparatus 140, a general digital TV that performs an IPTV service is preferably used. However, the present invention is not limited thereto. For example, a predetermined apparatus that can play a specified format of content may be used.

As the content hook-up apparatus 130, a general PC may be used, but the present invention is not limited thereto. For example, various kinds of apparatuses that can use an Internet service through a predetermined communication network can be used.

That is, in the content hook-up system according to an exemplary embodiment of the present invention, in order to provide the user-requested content, the first search is performed by the content hook-up apparatus 130 on a storage module 230, and then the second search is performed by the content hook-up apparatus 130 on the content provision server 110 according to whether or not the content exists in the storage module 230.

With the search by the content hook-up apparatus 130, a search list corresponding to the user's request is provided and predetermined content is downloaded according to the user's setting. The content that is downloaded to the content hook-up apparatus 130 is subject to format conversion so as to be playable on the display apparatus 140 and is transmitted to the display apparatus 140 in a streaming manner when requested by the user.

The reason why the content hook-up apparatus 130 performs the format conversion on the predetermined content is as follows. That is, the content to be provided from the content provision server 110 and metadata have various formats, and a bandwidth may vary according to the status of the network. Accordingly, Web content other than general broadcast content from the head end 100 cannot be stably provided to the display apparatus 140 in the streaming manner. In the content hook-up system according to an exemplary embodiment of the present invention, general broadcast content and various types of content on the Internet can be stably provided.

Figure 2:
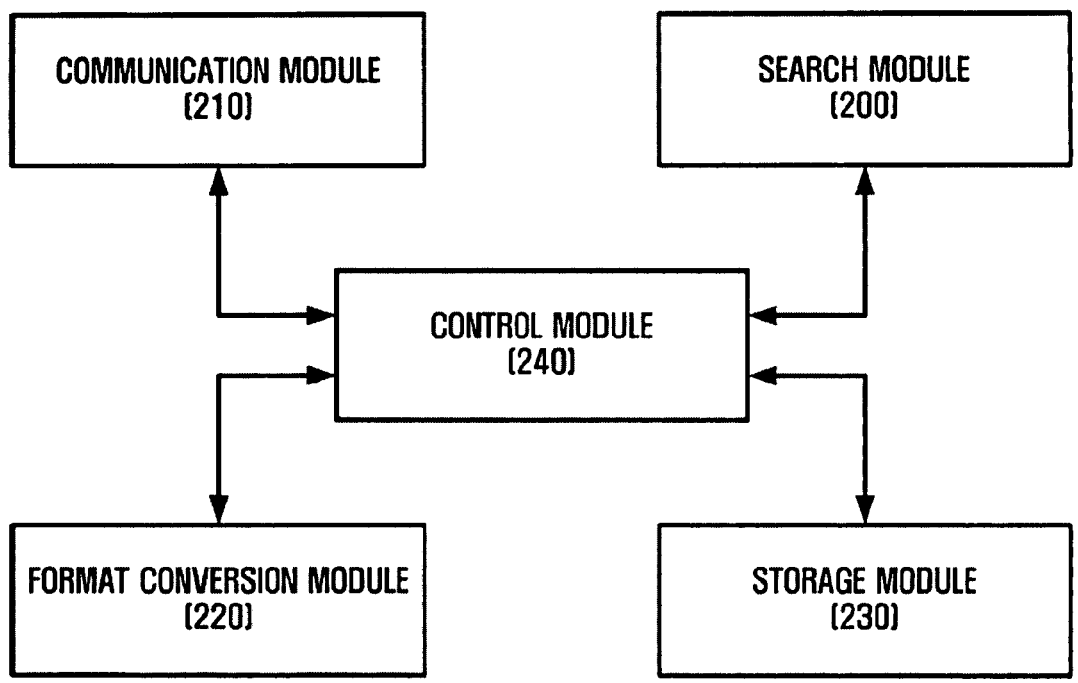
FIG. 2 is a diagram showing a content hook-up apparatus according to an exemplary embodiment of the present invention.

FIG. 2 is a diagram showing a content hook-up apparatus according to an exemplary embodiment of the present invention.

In the content hook-up apparatus 130 according to an exemplary embodiment of the present invention, the search module 200 performs content search, download, and format conversion on the basis of the keyword corresponding to the user's request and then provide the content to the display apparatus 140.

As shown in FIG. 2, the content hook-up apparatus 130 includes a search module 200, a communication module 210, a format conversion module 220, a storage module 230, and a control module 240.

The content hook-up apparatus 130 having the above-described components performs the content search, download, and format conversion using a system program that resides in a computer system and, when an application program or system is in a specified status, automatically provides various kinds of services. This program is provided as software and installed in the computer system by the user, and may be, for example, a daemon program.

First, the search module 200 is a module that, when the user requests content, searches for content corresponding to the user's request. The search module 200 performs the first search on the storage module 230 and then the second search on the content provision server 110 according to whether or not the content corresponding to the user's request is found on the storage module 230.

The content search is performed through at least one keyword corresponding to the content search or may be performed at a predetermined interval on the basis of a search list including a plurality of keywords.

The search list is created by an input module (not shown) having a set of numerals and characters in the content hook-up apparatus 130 or by an input module, such as a remote control (not shown), of the display apparatus 140.

The search list is preferably created when a category including predetermined content to be displayed on the display apparatus 140 is selected. At least one content or a plurality of content may be searched for at a predetermined interval corresponding to the search list.

The communication module 210 is a module that performs communication with the content provision server 110 or the display apparatus 140 in a predetermined method. The communication module 210 has an interface for communication with the content provision server 110 and an interface for connection to the display apparatus 140.

The communication with the content provision server 110 is performed to search for content corresponding to the user's request or download the searched content to the content hook-up apparatus 130. The communication between the communication module 210 and the display apparatus 140 is performed to transmit content subjected to format conversion from the content hook-up apparatus 130 to the display apparatus 140.

That is, the communication module 210 has an interface for performing communication with the content provision server 110 and an interface for providing the content subjected to the format conversion to the display apparatus 140 through a wired or wireless Internet network. Here, as the interface for communication with the display apparatus 140, a wired or wireless interface for local communication is exemplarily used, but the present invention is not limited thereto.

The format conversion module 220 converts various formats of content, which are searched and downloaded through the search module 200, so as to be playable on the display apparatus 140.

The format conversion in the format conversion module 220 may be performed while the content is downloaded from the content provision server 110 to the content hook-up apparatus 130, or may be performed while the content is provided from the content hook-up apparatus 130 to the display apparatus 140. Further, the format conversion may be performed at a specified step according to the user's setting.

The format conversion module 220 that converts the format of the content includes at least one format conversion program. The format conversion program can be updated through the communication module 210.

For example, when the content corresponding to the search list is a K3G-format moving picture taken by a cellular phone, and the display apparatus 140 can play only an MPEG-2 or AC3-format moving picture, the format conversion module 220 converts the K3G-format moving picture into the MPEG-2 or AC3-format moving picture so as to be playable on the display apparatus 140, and stores the converted moving picture in the storage module 230 or provides the converted moving picture to the display apparatus 140 through the communication module 210 in the streaming manner.

The storage module 230 is a module that stores content and predetermined information. The storage module 230 can be divided into two storage spaces, but in the exemplary embodiment of the present invention, the storage module 230 is incorporated into one space.

The storage capacity of the storage module 230 is set by the user when the program is installed in the content hook-up apparatus 130. The storage module 230 is also referred to as "Media Cache" in an exemplary embodiment of the present invention.

The content stored in the storage module 230 is downloaded from the content provision server 110. The content may be subjected to the format conversion and then stored or the original content may be stored according to the user's setting.

The predetermined information stored in the storage module 230 may include the search list corresponding to the user's request, a list of stored content, a search interval, a download interval, and information of the display apparatus 140. The predetermined information can be set by the user in advance.

Among these, the information of the display apparatus 140 can be used as reference information for the format conversion of the stored content or as reference information for updating the format conversion program.

The reference information for the format conversion is information that is used to compare the format of the content stored through the control module 240 and the format of the content playable on the display apparatus 140 and to determine whether or not to perform the format conversion.

The reference information for updating the format conversion program is information that is used to determine whether or not the format conversion program can perform the format conversion of the content when the content is determined to be subject to the format conversion.

The predetermined information stored in the storage module 230, such as the search list, the search interval, the download interval, and the format conversion information may be set by the user in advance. The search list may include metadata of content to be downloaded. Meanwhile, the information of the display apparatus 140 may be provided from the display apparatus 140 when the content hook-up apparatus 130 and the display apparatus 140 are connected to each other.

As such, the content stored in the storage module 230, which stores the content and the predetermined information, is updated by the search module 200 through comparison of the search list with the list of stored content by the control module 240. Then, the control module 240 maintains a reserve space of the storage module 230 in order to store predetermined content to be downloaded from the content provision server 110. The reason why the reserve space is maintained in the storage module 230 is to download predetermined content in real time according to the user's setting.

The control module 240 is a module that performs the overall control of the above-described modules. When the user requests content, the control module 240 controls the search module 200 to search the storage module 230 or the content provision server 110 for the content corresponding to the user's request. If the search by the search module 200 is completed, the control module 240 controls a display module (not shown) of the content hook-up apparatus 130 or the display apparatus 140 to display the search result list. Then, the user-selected content is downloaded through the communication module 210.

The control module 240 determines whether or not to perform the format conversion with reference to the information of the display apparatus 140 when the content is downloaded, and determines to perform the format conversion on the downloaded content or to store the downloaded content. In addition, the control module 240 deletes content other than the content in the search list among the content in the list of stored content from the storage module 230 and maintains the reserve space such that predetermined content corresponding to the search list can be stored therein.

According to an exemplary embodiment of the present invention, the content hook-up apparatus 130 or the content provision server 110 performs the search and download of the content corresponding to the search list. Then, the downloaded content is subject to the format conversion so as to be playable on the display apparatus 140 and then stored or provided to the display apparatus 140 in the streaming manner.

At this time, in the storage module 230 of the content hook-up apparatus 130, the reserve space is maintained such that the predetermined content corresponding to the search list can be downloaded.

FIG. 3 is a flowchart showing a content download process according to an exemplary embodiment of the present invention.

In the flowchart showing the content download process according to an exemplary embodiment of the present invention, the search is performed according to the keyword set by the user and the searched content is downloaded.

First, the control module 240 of the content hook-up apparatus 130 determines whether or not the user requests content S300.

The content request is made through the input module of each apparatus corresponding to the keyword input or category selection by the user.

When the user requests the content, it is determined whether or not the requested content exists in the storage module 230 of the content hook-up apparatus 130 (S310).

As described with reference to FIGS. 1 and 2, the content search includes the first search of the storage module 230 of the content hook-up apparatus 130 (S310) and the second search of the content provision server 110 (S320).

When it is determined that the user-requested content exists in the storage module 230, it is determined whether or not to perform the format conversion on the requested content (S340).

The determination whether or not to perform the format conversion at Step S340 is not limited thereto since, according to the user's setting, the format conversion of the content stored in the storage module 230 may be performed while the content is downloaded from the content provision server 110 or may be performed while the content is transmitted to the display apparatus 140.

When the user-requested content does not exist in the storage module 230, the search of the content provision server 110 is performed using the search module 200 (S320), and the searched content is downloaded to the storage module 230 of the content hook-up apparatus 130 (S330).

The content search and download through the storage module 230 of the content hook-up apparatus 130 or the content provision server 110 is performed at a predetermined interval according to the user's setting.

If the download of the user-requested content is completed (S330), it is determined whether or not to perform the format conversion on the downloaded content on the basis of the user's setting (S340).

As described above, the format conversion may be performed while the content is downloaded from the content provision server 110 or may be performed while the content is transmitted to the display apparatus 140 according to the user's setting.

If it is determined to perform the format conversion according to the user's setting (S340), the downloaded content is subject to the format conversion so as to be playable on the display apparatus 140 with reference to the display apparatus information (S350) and the content subjected to the format conversion is stored (S370).

At Step (S340) of determining whether or not to perform the format conversion, it is determined not to perform the format conversion, the downloaded original content is stored in the storage module 230 (S360).

The display apparatus information is information, such as a serial number of the display apparatus 140. The display apparatus information may be input by the user in advance or may be provided to the content hook-up apparatus 130 when the display apparatus 140 and the content hook-up apparatus 130 are connected to each other.

When the downloaded content is stored (S360) and the content subjected to the format conversion is stored (S370), the control module 240 deletes content other than the content in the search list among the content in the list of stored content and maintains the reserve space in the storage module, to thereby update the content of the storage module 230. That is, the reserve space is maintained such that predetermined content to be regularly downloaded through communication module 210 can be stored.

FIG. 4 is a flowchart showing a content hook-up process according to an exemplary embodiment of the present invention.

According to an exemplary embodiment of the present invention, content hook-up can be performed between the content hook-up apparatus 130 and the content provision server 110, and between the content hook-up apparatus 130 and the display apparatus 140.

First, it is determined whether or not the content hook-up apparatus 130 and the display apparatus 140 are connected to each other (S400). The reason why it is determined whether the two apparatuses are connected to each other is that the content hook-up is performed through the content hook-up apparatus 130, as described above.

If the display apparatus 140 and the content hook-up apparatus 130 are connected to each other, the display apparatus information is provided to the content hook-up apparatus 130.

If it is determined that the content hook-up apparatus 130 and the display apparatus 140 are connected to each other, it is determined whether or not the content request is forwarded from the user (S410).

As the determination of presence/absence of the content request (S410), if the content request is forwarded from the user, the content search of the storage module 230 in the content hook-up apparatus 130 is performed (S420).

At this time, when the content corresponding to the user's request does not exist in the storage module 230, as described above with reference to FIG. 2, the search of the content provision server 110, which is connected to the content hook-up apparatus 130 through a wired or wireless Internet network, is performed (S320). The detailed description thereof has already been given with reference to FIG. 2, and thus it will be omitted. In respect to the content hook-up according to an exemplary embodiment of the present invention, only the search of the storage module 230 in the content hook-up apparatus 130 will be described (S420).

That is, if the user-requested content is found in the storage module 230 (S420), the found content is transmitted through a communication interface connected to the display apparatus 140 in the streaming manner (S430).

The content to be transmitted to the display apparatus 140 in the streaming manner is preferably content subjected to the format conversion. The format conversion of the content has been described above with reference to FIGS. 1 to 3, and thus the detailed description thereof will be omitted.

In the content hook-up according to an exemplary embodiment of the present invention, in addition to the broadcast content to be provided from the head end 100, various formats of content to be provided through the Internet are downloaded, then subject to the format conversion so as to be playable on the display apparatus 140 according to the display apparatus information, and subsequently provided in the streaming manner. Further, since the content is provided between the content hook-up apparatus 130 and the display apparatus 140 in the streaming manner, a trick mode can be supported.

Although the present invention has been described in connection with the exemplary embodiments of the present invention, it will be apparent to those skilled in the art that various modifications and changes may be made thereto without departing from the scope and spirit of the invention. Therefore, it should be understood that the above exemplary embodiments are not limitative, but illustrative in all aspects. The scope of the present invention is defined by the appended claims rather than by the description preceding them, and all changes and modifications that fall within meets and bounds of the claims, or equivalences of such meets and bounds are therefore intended to be embraced by the claims.

According to the above-described content hook-up apparatus and method, in addition to standardized content of a general IPTV service, various formats of content on the Internet can be provided.

Further, since a service is provided using a media cache, a trick mode can be performed, similarly to existing content.

What is claimed is:

1. A content hook-up apparatus comprising:
   a memory which stores software modules; and
   a processor which executes the stored software modules,
   the software modules comprising:
   a search module which searches for content included in a predetermined search list and which updates a list of content stored in a predetermined storage module;
   a format conversion module which converts moving picture content, among the searched content, having a format unplayable on a predetermined display apparatus and playable on other type of display apparatuses into moving picture content having a format playable on the display apparatus, and provides a conversion result; and a communication module which transmits content, among the searched content, playable on the display apparatus, according to the conversion result, to the display apparatus.

2. The content hook-up apparatus of claim 1, wherein the storage module stores display apparatus information, which is referred to for the format conversion, and the searched content.

3. The content hook-up apparatus of claim 2, further comprising:

a control module which deletes content, excluding the content in the search list, among the content in the list of stored content to maintain a reserve space of the storage module.

4. The content hook-up apparatus of claim 2, wherein the format conversion module performs the format conversion using at least one format conversion program, which refers to the display apparatus information.

5. The content hook-up apparatus of claim 4, wherein the format conversion program is updated by a content provision server, which provides the content through a predetermined communication network.

6. The content hook-up apparatus of claim 1, wherein the search is performed in one of the storage module and a content provision server, which provides the content through a predetermined communication network.

7. The content hook-up apparatus of claim 1, wherein the communication module transmits the content playable on the display apparatus in a streaming manner.

8. The content hook-up apparatus of claim 1, further comprising:

a storage module which stores the content included in the predetermined search list, wherein the search module executes a first search by searching for the content in a storage module, and wherein if the content is not found in the storage module, the search module executes a second search by searching for the content in a remote server.

9. The content hook-up apparatus of claim 1, wherein predetermined search list is search results in response to user content request and wherein the search list is categorized based on whether each of the moving picture content can be played with or without format conversion.

10. A content hook-up system comprising:

a content provision server which provides content;

a content hook-up apparatus which converts moving picture content, among the content provided by the content provision server, having a format unplayable on a predetermined display apparatus and playable on other type of display apparatuses into moving picture content having a format playable on the display apparatus, and provides a conversion result; and the display apparatus which receives playable content, among the content provided by the content provision server according to the conversion result, and displays the received content.

11. The content hook-up system of claim 10, wherein the content hook-up apparatus is provided in the display apparatus or is connected to the display apparatus through a predetermined communication network.

12. A content hook-up method comprising:

searching for content included in a predetermined search list and updating a list of content stored in a predetermined storage module;

converting by a computer moving picture content having a format unplayable on a predetermined display apparatus, among the searched content, and playable on other type of display apparatuses into moving picture content having a format playable on the display apparatus, and providing a conversion result; and transmitting moving picture content playable on the display apparatus, among the searched content according to the conversion result, to the display apparatus.

13. The content hook-up method of claim 12, wherein the updating of the list comprises storing display apparatus information, which is referred to for the format conversion, and searched content.

14. The content hook-up method of claim 13, further comprising:

deleting content, excluding the content in the search list, among the content in the list of stored content to maintain a reserve space of the storage module.

15. The content hook-up method of claim 13, wherein the search is performed in one of the storage module and a content provision server, which provides the content through a predetermined communication network.

16. The content hook-up method of claim 13, wherein the converting is performed using at least one format conversion program that refers to the display apparatus information.

17. The content hook-up method of claim 16, wherein the format conversion program is updated by a content provision server, which provides the content through a predetermined communication network.

18. The content hook-up method of claim 12, wherein the transmitting the content playable on the display apparatus in performed in a streaming manner.

19. The content hook-up method of claim 12, wherein the converted moving picture content is played by the display apparatus in a trick mode.

20. The content hook-up method of claim 12, wherein the list of content stored in the predetermined storage module is updated in predetermined intervals based on the predetermined search list and wherein the content is part of Internet Protocol TV service.

* * * * *